United States Patent [19]

Larock

[11] Patent Number: 4,943,820
[45] Date of Patent: Jul. 24, 1990

[54] PORTABLE CAMERA SUPPORT

[76] Inventor: Warren D. Larock, 4526 Valley Park, S.W., Albuquerque, N. Mex. 87105

[21] Appl. No.: 420,918

[22] Filed: Oct. 13, 1989

[51] Int. Cl.$^5$ .............................................. G03B 29/00
[52] U.S. Cl. ..................................... 354/82; 354/293; 352/243; 248/169; 248/181; 248/187
[58] Field of Search ......................... 354/81, 82, 293; 352/243; 224/201, 265, 266, 908, 261; 248/187, 183, 168, 169, 181

[56] References Cited

U.S. PATENT DOCUMENTS

| | | | |
|---|---|---|---|
| 2,552,205 | 5/1951 | Moss | 354/82 X |
| 2,712,779 | 7/1955 | Tolcher | 354/82 X |
| 2,806,416 | 9/1957 | Jones, Jr. | 354/82 X |
| 3,105,430 | 10/1963 | Fernelius | 354/293 |
| 3,767,095 | 10/1973 | Jones | 224/261 |
| 3,882,524 | 5/1975 | Rauscher | 354/293 |
| 4,244,500 | 1/1981 | Fournier | 224/265 |
| 4,437,753 | 3/1984 | Dunn | 354/293 |
| 4,545,660 | 10/1985 | Rudolf | 354/82 |

Primary Examiner—Brian W. Brown
Attorney, Agent, or Firm—William A. Eklund; Deborah A. Peacock; Robert W. Weig

[57] ABSTRACT

A portable camera support. The camera support comprises a shoulder support member which rests on and extends forwardly from a user's shoulder and which supports a camera. A telescoping extension tube extends forwardly from the front end of the shoulder support member and is pivotably attached to a torso engaging support member, the lower end of which bears upon the user's chest or torso. A preferred adjustable bracing member permits selective adjustment of the height of the camera. A camera mounting plate permits forward and rearward adjustment of the position of the camera, as well as limited left- and right-handed rotation to accommodate left- and right-handed users.

19 Claims, 5 Drawing Sheets

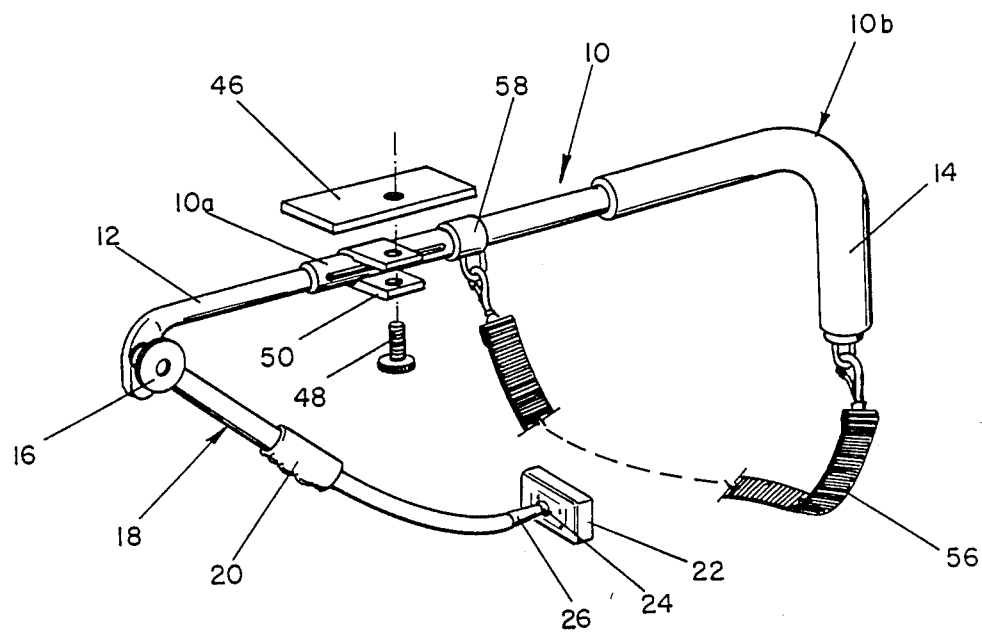
FIG—4
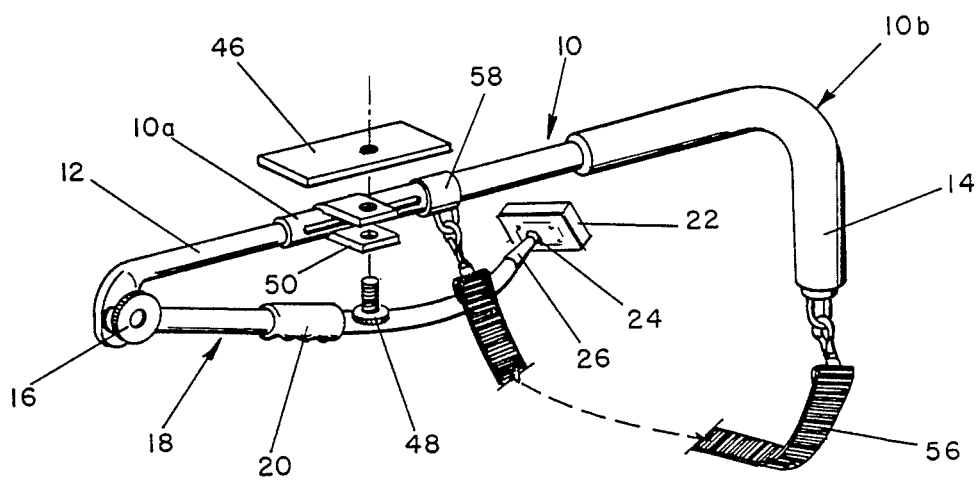
FIG—5

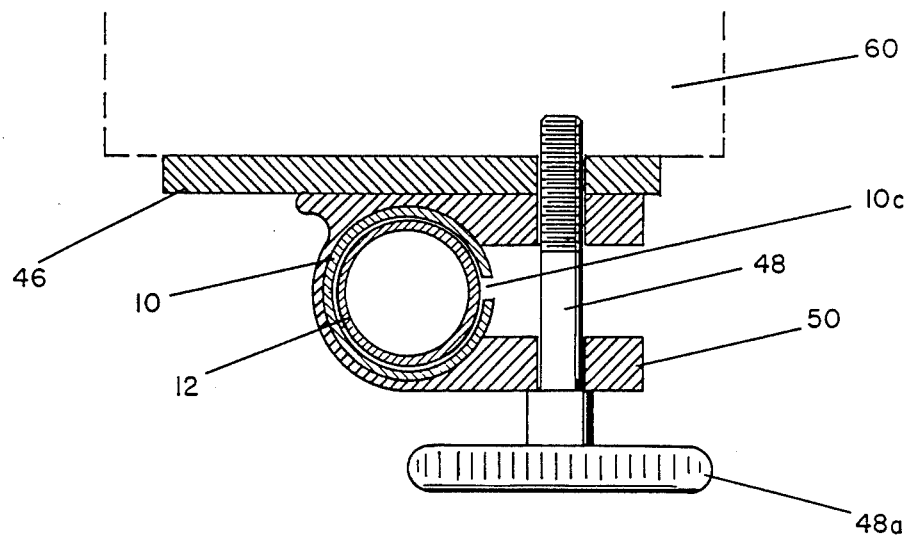
FIG—6
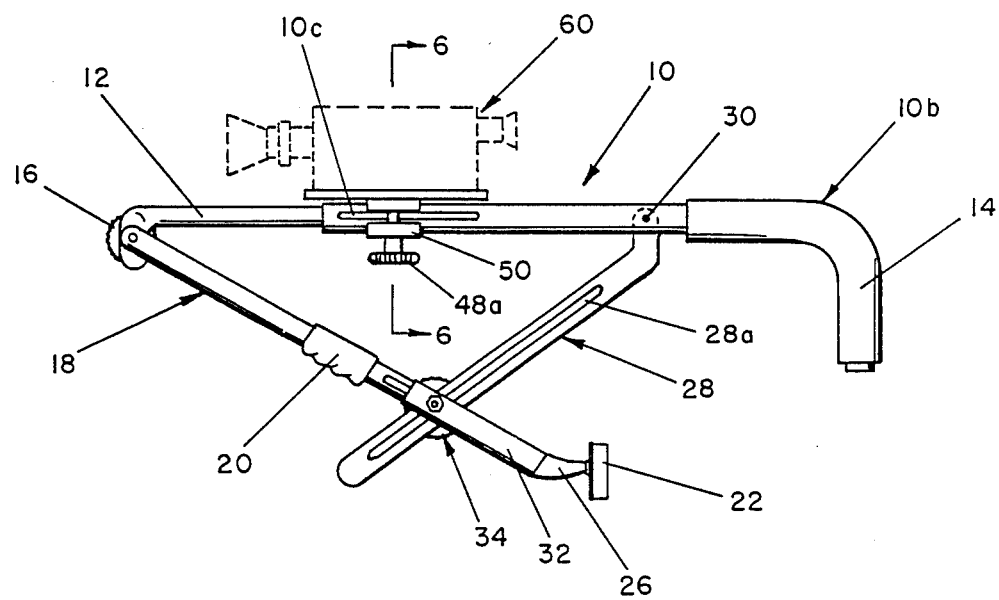
FIG — 7

PORTABLE CAMERA SUPPORT

BACKGROUND OF THE INVENTION

1. Field of the Invention (Technical Field)

The invention described and claimed herein is generally related to camera stands supportable on the human body and other similar devices for supporting video or film recording, photographic, or optical equipment. More particularly, the present invention is related to portable support devices for video cameras.

2. Description of Related Art Including Information Disclosed Under 37 CFR 1.97–1.99 (Background Art).

The advent of portable video cameras has spawned the new consumer activity of videotaping. A major obstacle to the production of high quality video tapes in non-studio environments is the problem of steadying the video camera for a substantial length of time. Although conventional camera tripods may be adequate for recording some activities, they are generally unsuitable for many video camera applications because they do not allow the video camera to be easily transported from place to place and they do not allow the camera to be quickly aimed in any direction. For example, tripods are impractical for use while sightseeing under crowded conditions. They are also inadequate in many applications where the video camera and/or the operator must move about to follow the subject being recorded. At the same time, it will be appreciated that it is difficult to hold a video camera steady for periods of more than a few minutes, especially because the video camera must normally be held close to the eyes to permit use of the viewfinder.

Several camera supports have been developed in the art to steady and support cameras. Such supports are disclosed in U.S. Pat. No. 2,806,416, entitled *Gun Stock Camera Support*, to Jones; U.S. Pat. No. 3,105,430, entitled *Camera Mount*, to Fernelius; U.S. Pat. No. 4,545,660, entitled *Camera Handle With Retractable Bipod Support*, to Rudolf; U.S. Pat. No. 4,437,753, entitled *Apparatus for Supporting a Camera Against the Sternum of the Photographer*, to Dunn; U.S. Pat. No. 2,712,779, entitled *Camera Support*, to Tolcher; U.S. Pat. No. 3,767,095, entitled *Camera Supporting Harness*, to Jones; U.S. Pat. No. 3,882,524, entitled *Apparatus for Holding a Camera Ready for Use*, to Rauscher; and U.S. Pat. No. 4,244,500, entitled *Viewing Support*, to Fournier.

The '416, '430, '660, and '753 patents all disclose a support which utilizes the user's sternum. However, these camera supports do not provide shoulder support for the camera or other device being supported.

The '779, '095, '524, and '500 patents all provide a shoulder support for a camera. However, none of these patents discloses the unique features of the present invention allowing for height, forward, and rearward positional adjustment of the camera, as well as left-handed and right-handed rotational adjustment.

SUMMARY OF THE INVENTION (DISCLOSURE OF THE INVENTION)

There is provided herein a portable camera support comprising a tubular shoulder support member having an open distal end and a proximal end, and an extension tube having proximal and distal ends. The proximal end of the extension tube may be telescopically slidably engaged in the open distal end of the tubular support member such that the distal end of the extension tube extends from the distal end of the shoulder support member. The proximal end of the shoulder support member may be adapted to rest upon a user's shoulder, and the shoulder support member may further comprise means for supporting a camera thereon. The portable camera support further comprises a torso engaging support member having a proximal end and a distal end, the distal end of which torso engaging support member may be pivotably connected to the distal end of the extension tube extending from the shoulder support member.

The portable camera support further comprises a structure for bracing the shoulder support member and the torso engaging support member relative to one another in a user selectable position. The bracing means comprises first and second ends, the first end of the bracing means being pivotably connected to the shoulder support member, and the second end of the bracing means being connectable to the torso engaging support member. The bracing means further comprises means for selectively securing the torso support tube to variable positions along the bracing means so as to provide for adjustment of the position of the camera with respect to a user. The bracing means may further comprise means for adjusting camera angle to and about the horizontal.

The bracing means of the portable camera support further comprises a slotted bracing bar, and means for selectively securing the torso engaging support member to variable positions along the slotted bracing bar which preferably comprises a friction bolt and nut assembly passing through and frictionally engaging the torso engaging support member and the slotted bracing bar. The shoulder support member is further curved downwardly so as to extend downwardly behind the user's shoulder and thereby prevent the camera support from falling forward off the user's shoulder, and may comprise padding disposed to engage a user's shoulder.

The shoulder support member and the telescoping extension tube of the portable camera support of the invention preferably comprise superposed slots along intermediate portions of their length, and means for supporting a camera on the shoulder support member comprising a camera mounting bolt and a mounting plate positionable on the shoulder support tube, the camera mounting further extending through the superposed slots in the shoulder support member and the extension tube. The portable camera support preferably further comprises friction nut means threadably engageable with the camera mounting bolt.

The camera supporting means of the portable camera support further comprises means for adjusting camera height with respect to the shoulder support member and means for positioning a camera viewfinder a selected distance from the user's viewing eye.

The proximal end of the torso engaging member further comprises torso engaging means adapted to frictionally engage and bear upon a user's chest and may comprise a universally pivotably adjustable chest pad. The torso engaging member may further be pivotably attached to the distal end of the telescoping extension tube extending from the distal end of the shoulder support member.

The portable camera support may further comprise a hand grip positionable on the torso engaging member and a body strap having first and second ends. The first end of the body strap may be attached to the proximal end of the shoulder support member and the second end of the body strap may be attached to the shoulder support member at a position immediately rearward of the camera support means. The strap may be further sized to extend snugly around the chest of the user and beneath the arm of the user opposite the shoulder support member.

The extension tube of the portable camera support of the invention may comprise a downwardly curved distal end so as no not obstruct any portion of the field of view of a camera having a wide angle field of view mounted on the camera support. The portable camera support may further comprise a camera mounting plate mounted on a clamp affixed to the shoulder support member, the clamp further comprising a camera bolt extending therethrough to secure the clamp to the shoulder support member and extending into the mounting plate. The shoulder support member may further comprise a longitudinal slot extending over the vicinity of the clamp, whereby clamping of the clamp about the shoulder support member to secure the mounting plate also operates to compress the shoulder support member about the extension tube so as to preclude longitudinal or rotational slippage of the extension tube.

These and other aspects of the present invention will be more apparent upon consideration of the following detailed description of the invention, when taken with the accompanying drawings.

Accordingly, the object and purpose of the present invention is to a provide portable camera support which permits a user to film or tape for an extended period of time without suffering fatigue.

It is also an object and purpose of the present invention to provide a portable camera support which allows a user to support a camera in a position for use, while at the same time freeing the user's hands for other purposes. These and other objects and purposes are attained in the portable camera support of the present invention.

BRIEF DESCRIPTION OF THE DRAWINGS

The accompanying drawings, which are incorporated into and form a part of this specification, illustrate several embodiments of the present invention and, together with the description set forth below, serve to illustrate the principles of the invention.

FIG. 4 is an isometric, partially exploded view of the preferred embodiment of the invention shown in FIGS. 1 through 3;

FIG. 5 is a partially exploded isometric view as in FIG. 4, but with the camera support folded as for transport;

FIG. 6 is an end view in cross section of the camera mounting plate and associated components of the invention, taken along section line 6—6 as shown in FIG. 7;

FIG. 7 is a side view of a second preferred embodiment of the invention;

Figure 1:
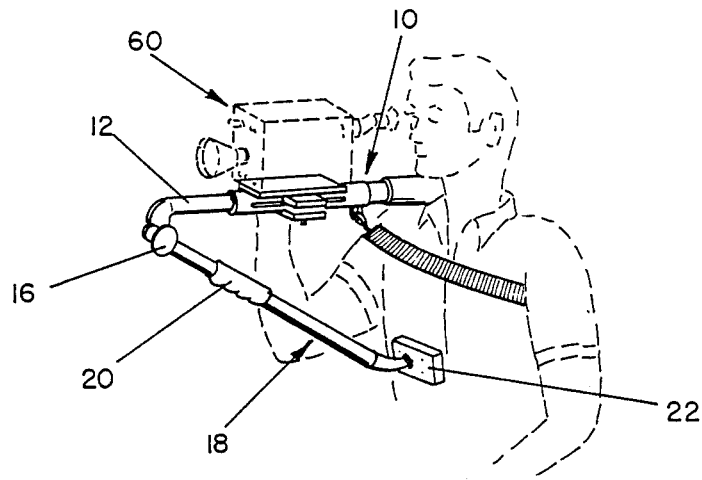
FIG. 1 is an isometric side view of a preferred embodiment of the portable camera support of the present invention, supported on an individual in a position for use.

DETAILED DESCRIPTION OF THE PREFERRED EMBODIMENT OF THE INVENTION (BEST MODES FOR CARRYING OUT THE INVENTION)

Referring to the Figures, a preferred embodiment of the camera support of the present invention shown in FIGS. 1 through 5 includes a tubular shoulder support member 10, which receives at its distal, or open forward end 10a, a telescoping extension tube 12 that is adjustably slidable inwardly and outwardly from the shoulder support member 10. The shoulder support member 10 includes a downwardly curved proximal, or rear, portion 10b which is provided with a soft molded padding 14 formed of rubber, synthetic urethane polymer, or the like. The proximal downwardly curved portion 10b is adapted to rest comfortably over one shoulder of the user, so that the user's shoulder bears a substantial portion of the weight of a camera supported on the shoulder support member 10, as described further below. The proximal portion 10b also operates to safely retain the support member 10 and the thus the camera against sliding forwardly off the shoulder of the user.

Figure 2:
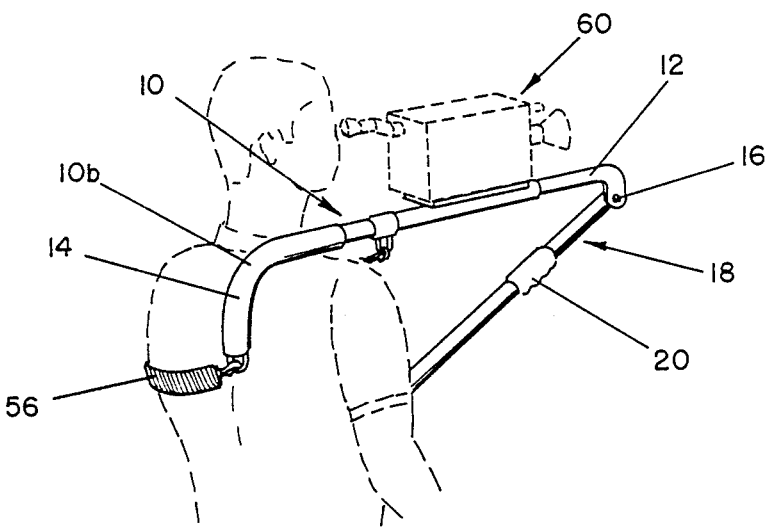
FIG. 2 is an isometric rear view of the camera support shown in FIG. 1, also shown in use.
Figure 3:
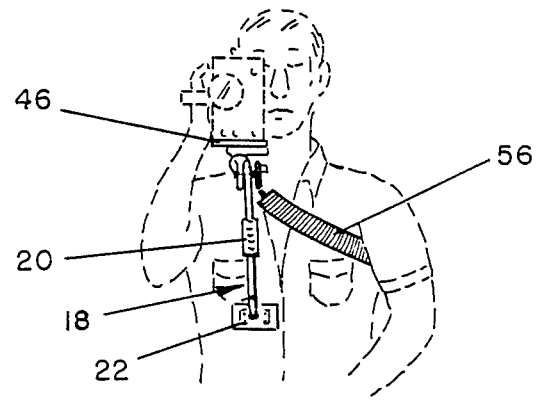
FIG. 3 provides a front end view of the camera support shown in FIG. 1, also shown in use.

The extension tube 12 is curved downwardly at its forward end and is pivotably connected at its end by means of a locking hand nut 16 to a torso engaging support member 18, which in its ordinary position and orientation extends downwardly and inwardly at an angle toward the user's chest or torso from the distal end of the extension tube 12, as shown for example in FIGS. 1, 2 and 4. The extension tube 12 is curved downwardly at its forward end so as to not obstruct or interfere with a wide angle field of view of a camera mounted on the shoulder support member 10. The locking hand nut 16 serves to selectively secure the torso support member 18 to the extension tube 12 at any desired angle. In use, this angle will be set for optimum fit and comfort according to the size of the user. When the camera support is not it use, the locking hand nut 16 allows the torso support member 18 to be folded upwardly in a compact manner against the shoulder support member 10, thereby allowing the camera support to be stowed or transported in a compact configuration, as shown in FIG. 5.

The torso support member 18 is preferably provided with a hand grip 20 formed of a soft rubber or synthetic polymeric material such as polyurethane, by which the user may stabilize and position the torso support member 18 and thereby the camera. The hand grip 20 may be adjustable upwardly or downwardly, or side to side, by using set screws or other means common to the art. A chest or torso engaging pad 22 is provided at the lower end of the torso support member 18. The chest engaging pad 22 is attached to a universally pivotable ball joint 24 which extends from one end of a threaded insert 26. The threaded insert 26 is engaged in the lower end of the torso support member 18 and allows the chest engaging pad 22 to be extended or retracted with respect to the lower end of the torso support member 18.

FIG. 7 illustrates an alternative preferred embodiment. It will be understood that those elements of the embodiment shown in FIGS. 1-5 and the embodiment shown in FIG. 7 which are identical in function and structure are indicated with like reference numerals throughout the Figures.

The embodiment shown in FIG. 7 includes a flat slotted bracing bar 28 which extends from an intermediate position on the torso support member 18 to a position on the shoulder support member 10 immediately forward of the shoulder padding 14. The bracing bar 28 is pivotably connected to the shoulder support member 10 by means of a pivot pin 30. The bracing bar 28 includes a longitudinal slot 28a that extends along a majority of the length of the bracing bar 28, and which allows the bracing bar 28 to be selectively secured by the user to the torso support member 18 at various points along the length of the bracing bar 28.

Figure 8:
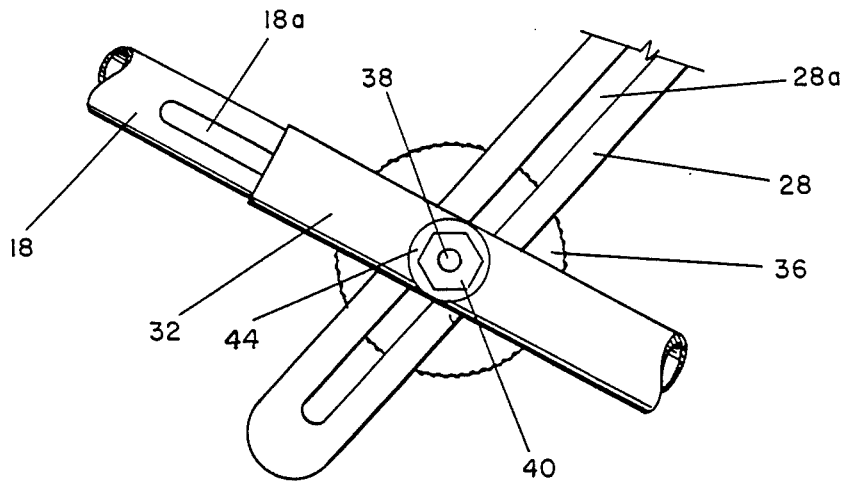
FIG. 8 is an enlarged side view of a portion of the preferred embodiment shown in FIG. 7.
Figure 9:
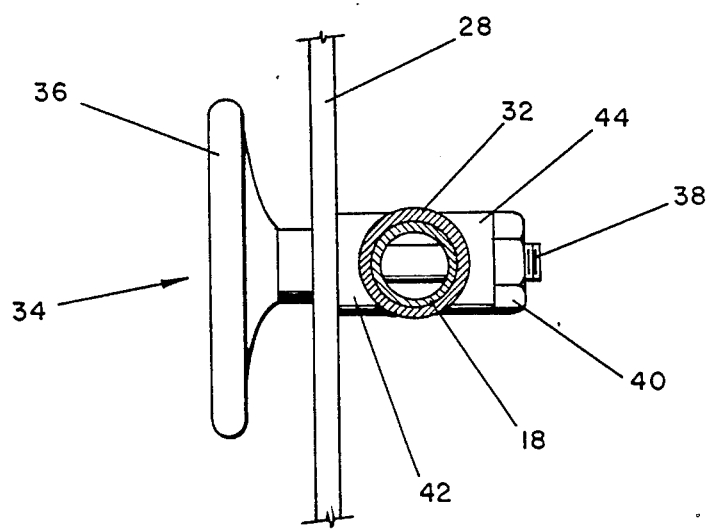
FIG. 9 is a front view in cross section of the portion of the camera support shown in FIG. 8.

In this embodiment, shown in FIG. 7, the torso support member 18 is slidably engaged in a tubular sleeve 32 which receives the torso support member 18 in its upper end and which receives the threaded insert 26 at its lower end. The bracing bar 28 is selectively secured to the torso support member 18 by means of a friction nut assembly 34, shown in detail in FIGS. 8 and 9, and which provides for adjustment of the position of the camera with respect to the user. The friction nut assembly includes a hand knob 36 which is affixed to an integral threaded bolt 38 which passes through a bore in the tubular sleeve 32, and which also passes through a longitudinal slot 18a in the torso support member 18. The bolt 38 is engaged in a friction nut 40. A pair of cylindrically curved spacers 42 and 44, best shown in FIG. 9, mate the nut 40 and the bracing bar 28 to the tubular sleeve 32.

The friction nut assembly 34, shown in FIG. 7, allows the torso support member 18 to be adjusted to varying lengths and to varying angles with respect to the shoulder support member 10. These adjustments can be made with one hand, simply by relaxing the friction nut assembly 34 with the hand knob 36, and subsequently adjusting the fit and then tightening the friction nut assembly 34 once again.

Referring to FIG. 6, the shoulder support member 10 supports a camera mounting plate 46. The mounting plate 46 is secured to the shoulder support member 10 by means of a camera bolt 48 having a hand knob 48a, and an associated clamp 50. The camera bolt 48 extends through bores in opposite integral arms of the clamp 50, so as to compress the arms of the clamp around the shoulder support member 10 as well as the enclosed extension tube 12. In this regard, the shoulder support member 10 includes a single slot 10c extending along a portion of its length in the vicinity of the camera support plate 46. The slot 10c allows the shoulder support member 10 to be compressed around the extension tube 12, firmly engaging it against both longitudinal sliding motion and against relative rotational motion. It will be noted that this arrangement allows the extension tube 12, and thus also the torso support member 18, to be rotated slightly about the axis of the shoulder support member 10 and to be fixed in such a position. This allows the shoulder support member 10 to be rotated to a comfortable position on the shoulder of the user, while also allowing the torso support member to be rotated to a comfortable position. Additionally, the camera support plate 46 can be independently rotated to a level position regardless of the orientation of the shoulder support member 10, by loosening, and rotating the clamp 50 about the shoulder support member until the camera support plate 46 is level.

Figure 10:
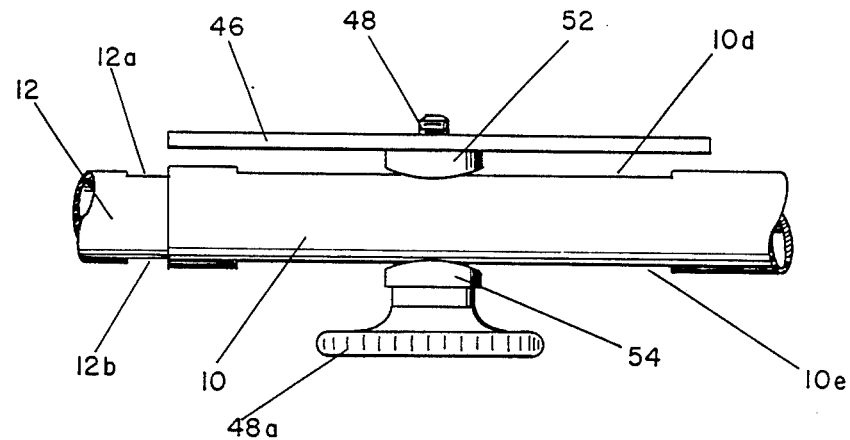
FIG. 10 is a side view of an alternative preferred means for mounting a camera on the camera support, which may be employed in either the embodiment shown in FIGS. 1 through 5, or in the embodiment shown in FIG. 7.
Figure 11:
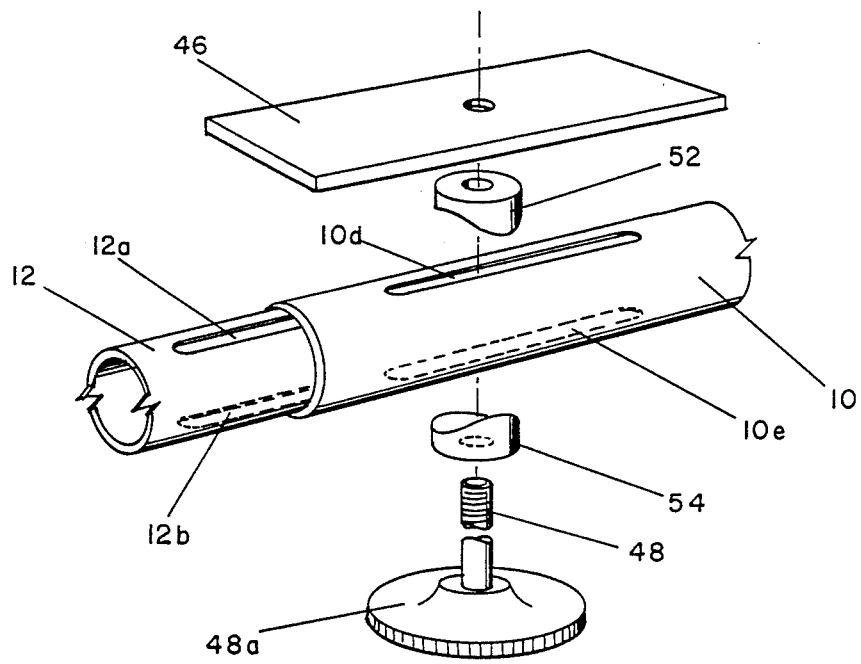
FIG. 11 is an exploded isometric view of the alternative camera mounting means shown in FIG. 10.

In an alternative embodiment, shown in FIGS. 10 and 11, the camera mounting plate 46 is mounted on the shoulder support member 10 by means of a pair of upper and lower cylindrically curved spacers 52 and 54, respectively. The camera bolt 48, with hand knob 48a at its lower end, extends upwardly through the spacers 52 and 54, and through a pair of upper and lower slots 10d and 10e formed in the shoulder support member 10, and through a pair of upper and lower slots 12a and 12b formed in the extension tube 12. The slots 10d and 10e, and the slots 12a and 12b, are approximately nine inches long. It will be appreciated that the slots serve several functions. First, the slots 10d and 10e in the shoulder support member 10 allow the position of the camera support plate 46 to be moved forward or rearward with respect to the user's face and shoulders. The slots 10d and 10e also allow the shoulder support member 10 to be readily compressed around the extension tube 12 so as to secure it in place. The slots 12a and 12b in the extension tube 12 allow the extension tube 12 to be independently extended or retracted relative to the shoulder support member 10, without affecting the position of the camera support plate 46 but at the same time allowing the user to adjust the torso support member 18 to optimum fit and comfort.

The camera support of the present invention further includes a body strap 56 which is attached at one end to the lower end of the rear proximal portion 10b of the shoulder support 10, and which attaches at its opposite end to the support member 10 at a clamp ring 58 located at a point immediately rearward from the camera support plate 46. The body strap 56 extends around the user's chest and beneath the arm opposite the shoulder support member 10 and serves to stabilize the camera support against swinging lateral motion, while also allowing the user free use of his or her hands while still supporting the camera, as shown in FIG. 2. The clamp ring 58 may be adjustable, such as by a set screw or other means common to the art, for allowing the clamp ring 58 to slide forward or backward on the support member 10.

In use, the rear portion 10b of the shoulder support member 10 is rested on the user's shoulder with a camera 60 mounted on plate 46 and positioned for optimum viewing. In this regard, the position and orientation of the camera 60 is adjustable in several ways. First, the mounting plate 46 is rotatable in a horizontal plane about the camera bolt 48 over an angular range of at least five to seven degrees (5° to 7°) in either direction, thereby allowing for use by either left-handed or right-handed (or left-eyed or right-eyed) users. Further, the height of the camera 60 with respect to the user is selectively adjusted in the embodiment shown in FIGS. 7, 8 and 9 by means of the friction nut assembly 34, which also adjusts to a lesser extent the position of the chest support 22. In the embodiment shown in FIGS. 1 through 5 the height of the camera 60 is adjusted by setting the angle of the torso support member 18 with the friction nut 16, and by also extending or retracting the threaded sleeve 26.

Finally, the mounting plate 46 is adjustable forwardly and rearwardly on the shoulder support member 10, by means of the slidable clamp 50 of the embodiment shown in FIGS. 1 through 7, or by means of sliding spacers 52 and 54 of the embodiment shown in FIGS. 10 and 11.

The present invention is described and illustrated above with reference to several preferred embodiments. Nevertheless it will be understood that various modifications, alterations and substitutions may be apparent to one of ordinary skill in the art, and that such modifications, alterations and substitutions may be made without departing from the essential invention. Accordingly, the scope of the present invention is defined only by the following claims.

The embodiments of the invention in which patent protection is claimed are as follows:

1. A portable camera support comprising:
   a tubular shoulder support member having an open distal end and a proximal end, an extension tube having proximal and distal ends, said proximal end of said extension tube being telescopically slidably engaged in said open distal end of said tubular support member such that said distal end of said extension tube extends from said distal end of said shoulder support member, said proximal end of said shoulder support member being adapted to rest upon a user's shoulder, and said shoulder support member further comprising means for supporting a camera thereon; and
   a torso engaging support member having a proximal end and a distal end, said distal end of said torso engaging support member being pivotably connected to said distal end of said extension tube extending from said shoulder support member.

2. The portable camera support defined in claim 1 further comprising means for bracing said shoulder support member and said torso engaging support member relative to one another in a user selectable position, said bracing means having first and second ends, said first end of said bracing means being pivotably connected to said shoulder support member, and said second end of said bracing means being connectable to said torso engaging support member, and said bracing means comprising means for selectively securing said torso support tube to variable positions along said bracing means so as to provide for adjustment of the position of the camera with respect to a user.

3. The portable camera support defined in claim 2 wherein said bracing means comprises means for adjusting camera angle to and about the horizontal.

4. The portable camera support defined in claim 2 wherein said bracing means comprises a slotted bracing bar, and wherein said means for selectively securing said torso engaging support member to variable positions along said slotted bracing bar comprises a friction bolt and nut assembly passing through and frictionally engaging said torso engaging support member and said slotted bracing bar.

5. The portable camera support defined in claim 1 wherein said proximal end of said shoulder support member is curved downwardly so as to extend downwardly behind the user's shoulder and thereby prevent the camera support from falling forward off the user's shoulder.

6. The portable camera support defined in claim 1 wherein said proximal end of said shoulder support member further comprises padding disposed to engage a user's shoulder.

7. The portable camera support defined in claim 1 wherein said shoulder support member and said telescoping extension tube are each provided with superposed slots along intermediate portions of their length, and wherein said means for supporting a camera on said shoulder support member comprises a camera mounting bolt and a mounting plate positionable on said shoulder support tube, said camera mounting extending through said superposed slots in said shoulder support member and said extension tube.

8. The portable camera support defined in claim 7 further comprising friction nut means threadably engageable with said camera mounting bolt.

9. The portable camera support defined in claim 1 wherein said camera supporting means provides means for adjusting camera height with respect to said shoulder support member.

10. The portable camera support defined in claim 1 wherein said camera supporting means comprises means for positioning a camera viewfinder a selected distance from the user's viewing eye.

11. The portable camera support of claim 1 wherein said proximal end of said torso engaging member comprises torso engaging means adapted to frictionally engage and bear upon a user's chest.

12. The portable camera support defined in claim 11 wherein said torso engaging means comprises a chest pad.

13. The portable camera support defined in claim 12 wherein said chest pad is universally pivotably adjustable.

14. The portable camera support defined in claim 1 wherein said torso engaging member is pivotably attached to said distal end of said telescoping extension tube extending from said distal end of said shoulder support member.

15. The portable camera support defined in claim 1 further comprising a hand grip positionable on said torso engaging member.

16. The portable camera support defined in claim 1 further comprising a body strap having first and second ends, said first end of said body strap being attached to said proximal end of said shoulder support member and said second end of said body strap being attached to said shoulder support member at a position immediately rearward of said camera support means, said strap being sized to extend snugly around the chest of the user and beneath the arm of the user opposite said shoulder support member.

17. The portable camera support defined in claim 1 wherein said extension tube comprises a downwardly curved distal end so as to not obstruct any portion of the field of view of a camera having a wide angle field of view mounted on said camera support.

18. The portable camera support defined in claim 1 further comprising a camera mounting plate mounted on a clamp affixed to said shoulder support member, said clamp comprising a camera bolt extending therethrough to secure said clamp to said shoulder support member and extending into said mounting plate.

19. The portable camera support defined in claim 18 wherein said shoulder support member comprises a longitudinal slot extending over the vicinity of said clamp, whereby clamping of said clamp about said shoulder support member to secure said mounting plate also operates to compress said shoulder support member about said extension tube so as to preclude longitudinal or rotational slippage of said extension tube.

* * * * *